Figure 1:
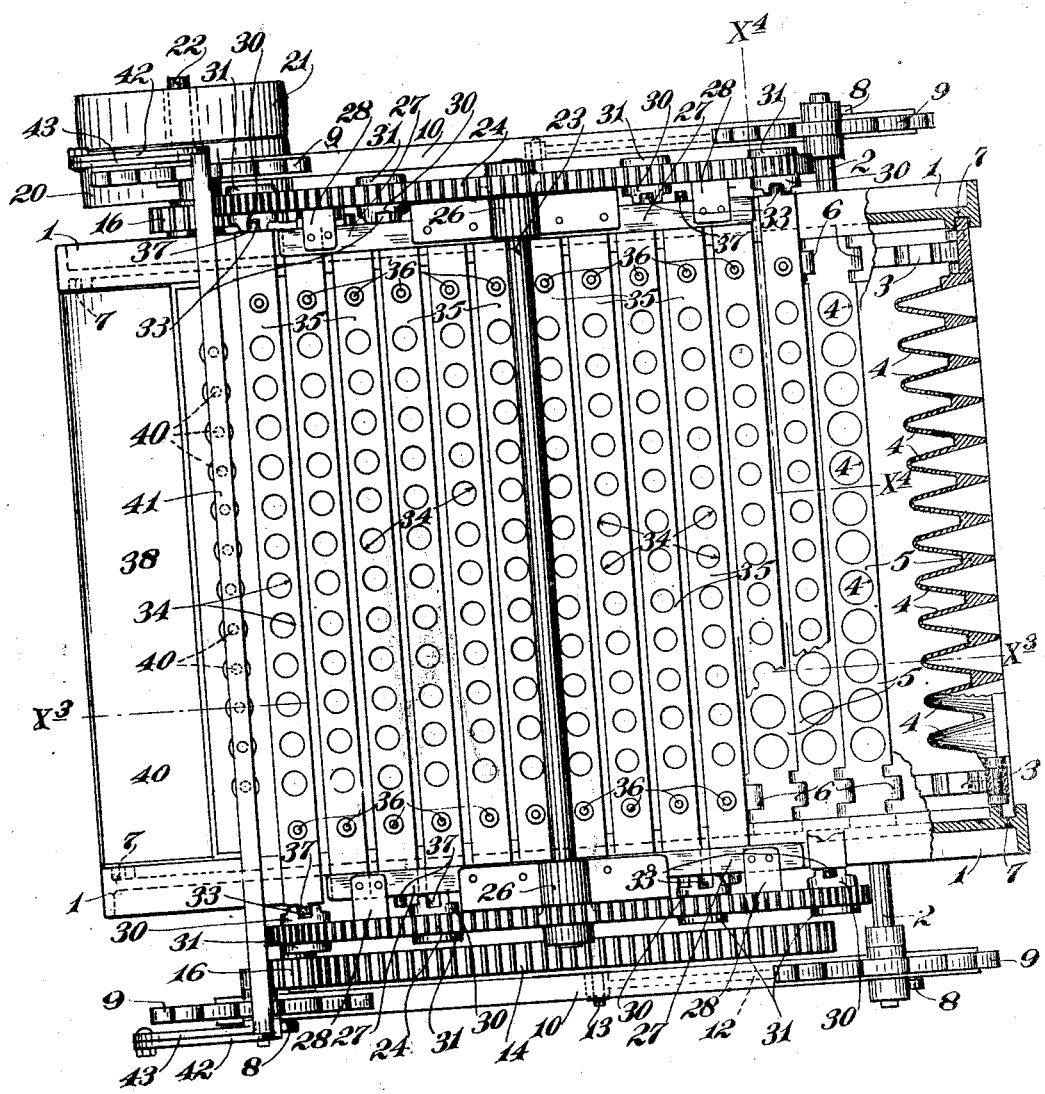

K. WESSEL.
MACHINE FOR MAKING ICE CREAM CONES.
APPLICATION FILED AUG. 3, 1908.

1,148,642.

Patented Aug. 3, 1915.
3 SHEETS—SHEET 2.

Witnesses.
A. H. Opsahl.
W. H. Souba.

Inventor.
Karl Wessel
By his Attorneys
Williamson Merchant

K. WESSEL.
MACHINE FOR MAKING ICE CREAM CONES.
APPLICATION FILED AUG. 3, 1908.
1,148,642.
Patented Aug. 3, 1915.
3 SHEETS—SHEET 3.
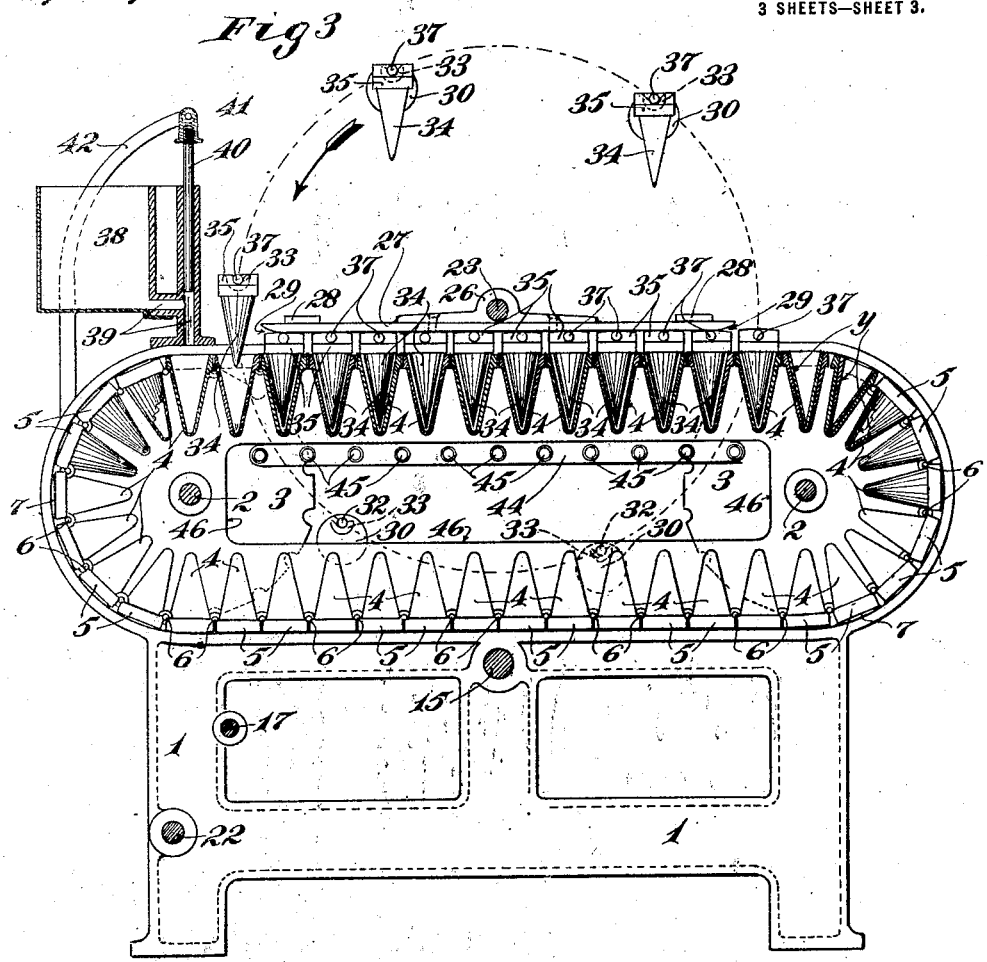
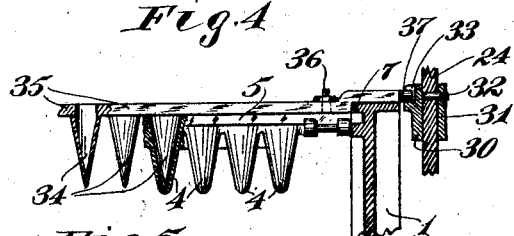
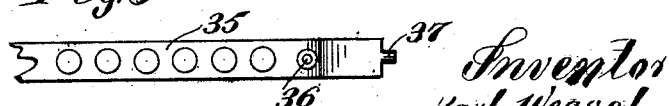
Witnesses.
A. H. Opsahl.
W. H. Souba.
Inventor
Karl Wessel
By his Attorneys
Williamson & Merchant

UNITED STATES PATENT OFFICE.

KARL WESSEL, OF ST. PAUL, MINNESOTA, ASSIGNOR TO ST. PAUL CORNET COMPANY, OF ST. PAUL, MINNESOTA, A CORPORATION OF MINNESOTA.

MACHINE FOR MAKING ICE-CREAM CONES.

1,148,642.  Specification of Letters Patent.  Patented Aug. 3, 1915.

Application filed August 3, 1908. Serial No. 446,651.

*To all whom it may concern:*

Be it known that I, KARL WESSEL, a citizen of the United States, residing at St. Paul, in the county of Ramsey and State of Minnesota, have invented certain new and useful Improvements in Machines for Making Ice-Cream Cones; and I do hereby declare the following to be a full, clear, and exact description of the invention, such as will enable others skilled in the art to which it appertains to make and use the same.

My present invention has for its object to provide a machine of high capacity for making baked cones or cornets such as are extensively used for holding ice cream.

To the above ends the invention consists of the novel devices and combinations of devices hereinafter described and defined in the claims.

In this improved machine I employ a very large number of molds which are preferably made conical and connected in series to carrying bars, which bars are arranged in an endless series, to form an endless metallic belt of considerable width.

Suitable guiding means for the mold-equipped bars, and means for imparting traveling motion to the endless series of belt thereof, are also provided.

For coöperation with these mold-equipped bars, I provide several series of cores, preferably of conical form, and connected to loose individual bars. The number of core-equipped bars may be very much less than the number of mold-equipped bars in the endless belt, but the number of cores on each bar should be equal to the number of molds on each bar of the said belt.

By means of a so-called bar shifter, preferably afforded by a pair of wheels provided with core bar holders, the core equipped bars are, in succession, positioned in the alined molds of the endless belt; and by said core bar shifter, the core bars are, in succession, picked out of the molds, after they have traveled a proper distance therewith and have remained therein for a sufficient interval of time to permit baking of the dough which is injected into the molds, preferably just before the cores are inserted therein.

Suitable means is also provided for accurately positioning the cores of the molds and for holding the same thus positioned while traveling with the molds.

In the accompanying drawings which illustrate the improved machine, like characters indicate like parts throughout the several views.

Figure 2:
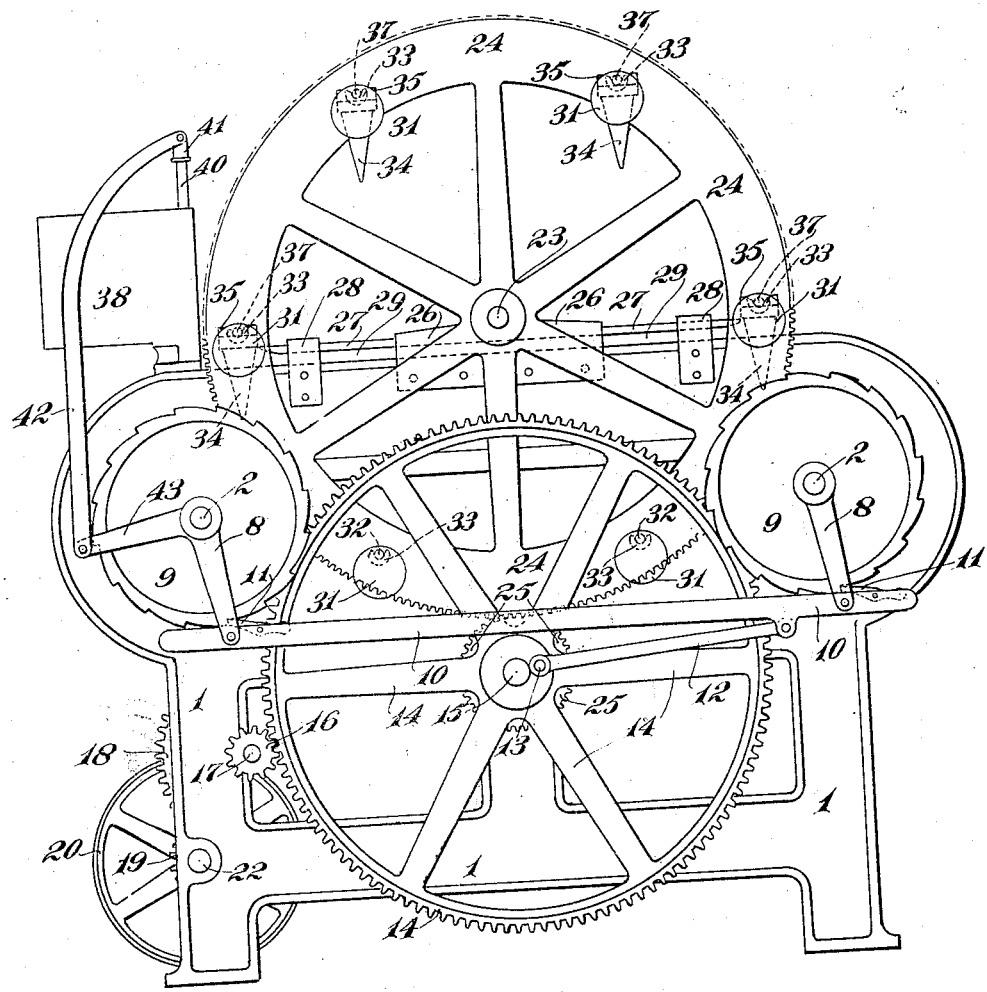

Referring to the drawings, Figure 1 is a plan view of the improved machine, some parts being shown in section and some parts being broken away. Fig. 2 is a side elevation of the said machine. Fig. 3 is a vertical section taken on the line $x^3$ $x^3$ of Fig. 1, some parts being shown in full. Fig. 4 is a fragmentary view partly in elevation and partly in section on the line $x^4$ $x^4$ of Fig. 1; and Fig. 5 is a plan view of one of the core-equipped bars, some parts being broken away.

The frame-work of the machine, as shown, is made up of a pair of laterally spaced cast side plates 1, suitably tied together and adapted to be rigidly secured to the floor. A pair of transverse parallel shafts 2, which are at the same height from the floor, are journaled in the side plates 1, and each carries a pair of laterally spaced sprocket-like wheels 3.

The conical molds 4 are secured to and preferably formed integral with bars 5, the edges of which are closely connected near their ends, by hinged joints 6. The ends of these bars 5 work in endless grooves 7 formed in the inner faces of the side plates. The end portions of these grooves 7 are concentric to the axis of the shafts 2, but the upper and lower main portions thereof are horizontally extended so that they form complete or endless guides for the said bars 5 and support the molds in operative positions with their open end upward, as shown in section in Figs. 3 and 4. It is, of course, evident that the endless chain or belt made up of the mold equipped bars 5 is arranged to run over the two pairs of sprocket wheels 3.

As a simple and efficient means for imparting intermittent or step by step movement to this mold-equipped belt, depending arms 8 are pivoted on the ends of the shafts 2, and ratchet wheels 9 are secured to the ends of said shafts, adjacent to said arms. A link 10 connects the free ends of the arms 8, and this link, as shown, is provided with a pair of gravity actuated pawls 11 that coöperate one with each of the said ratchet wheels 9. The link 10 is connected, by a crank rod 12, to a wrist pin 13 carried by the hub of a large spur gear 14 carried by a transverse shaft 15 journaled in the sides of the frame 1. This large spur gear 14 meshes with a relatively very small pinion 16 carried by a transverse counter shaft 17 journaled in the sides of the frame 1 and provided, at one end, with a small spur gear 18 which, in turn, meshes with a spur pinion 19 carried by the hub of a pulley 20, which pulley 20 and an idle pulley 21 are journaled on a shaft 22 rigidly secured to the sides of the frame 1. The chain of driving gears and the pawl and ratchet devices above described serve to transmit, from a pulley running at high speed, a slow intermittent or step by step movement to the endless belt made up of the mold-equipped bars 5.

Extending transversely and centrally of the machine, a short distance above the upper portion of the endless belt made up of the said mold-equipped bars, and journaled in suitable bearings afforded by the side plates of the frame 1, is a shaft 23 that carries a pair of large laterally spaced gears 24 which, as shown, mesh with pinions 25 carried by the counter shaft 15. The shaft 23 is journaled in bearings 26, supported on the intermediate portions of horizontally extended guide bars 27. These guide bars 27, as shown, are supported from the sides of the frame 1 by angle brackets 28, and the said bars extend parallel to but are spaced apart from the horizontal upper edges of the said side plates 1, so as to afford guide channels 29, for an important purpose which will presently appear. On their inner faces the two gears 24 are provided with pivotally-mounted, gravity-arighted core bar holders, of which, as shown, there are six on each gear or wheel. As shown, each of these holders comprises an inner head 30 and an outer head 31, both eccentrically secured to a pin 32 journaled in the corresponding gear. The inner head 30 is provided with an approximately U-shaped trunnion seat 33. The weight of the heads 30 and 31 will keep the open tops of the seats 33 upward throughout the rotation of the gears. The gears or wheels 24 and the holders afford a simple and efficient core bar shifter or transferring device.

The conical cores 34 are secured to and preferably formed integral with core bars 35 and, for lightness, are cast hollow. These cores 34 are of such size that when placed within the molds 4, with their bars 35 resting on the mold bars 5, as shown in Figs. 3 and 4, the proper conical spaces between the molds and cores will be afforded to properly form the cone or cornet. To hold the said molds and cores in concentric arrangement, when the latter are inserted into the former, the bars 5 are provided with dowel pins 36 (see Figs. 4 and 5) that then enter suitable seats in the core bars 35.

At their ends the core bars 35 are provided with trunnions 37 that are adapted to rest in the open seats 33 of the pivoted core bar holders, as best shown in Figs. 3 and 4.

By the gear connections described, the core bar shifter made up of the gears 24 and pivoted holders will be slowly but continuously rotated, while the endless belt made up of the mold bars will be intermittently moved, but the time of the former in respect to the latter is such that when a core bar moving in the direction of the arrow indicated on Fig. 3 reaches an operative position, its cores will be dropped into the molds of an underlying mold bar and will be alined with the latter by the dowel pins 36 thereon. The core bar holders thus relieved from this positioned core bar will move downward and onward, while by the next intermittent movement of the sprocket wheels 3, such positioned core bar, at its ends, will be carried under the fixed guiding and retaining bars 27. Thus it will be seen that quite a large number of these core-equipped bars will always be within the guide channel 29 with their cores projected into coöperating molds. The empty core bar holders will, as already stated, be held in arighted positions by gravity, and as they are moved upward they will pick up, in succession, the mold bars which have been passed beyond the rear ends of the guide bars 27 and out of the guide channels 29, and will carry the same upward, forward, and then downward and deposit the same again in an operative position, as before stated, at the receiving end of the guide channel 29.

Thus it will be seen that the molds and cores move in endless circuits or orbits which are located entirely outside of each other, such circuits being superposed, and the two endless series moving in opposite directions. These series of devices which in reality form coöperating mold sections, have their runs substantially coincident with each other throughout a certain distance, that is to say, the upper run of the lower series substantially coincides with the lower run of the upper series, the molds and cores being held together in this coincident portion of the runs while the baking is being effected by means of the heating device over which the mold sections move.

Just before the cores are inserted into the molds, as above described, the proper amount of dough, in light plastic or semifluid condition, will be inserted into the same from a suitable pumping or injecting device; and as the molds having cores therein are moved together they will be subjected to a baking heat from a suitable burner located within a sort of an oven formed within the endless belt made up of the mold bars 5 and between the sides of the frame 1.

The dough supplying device comprises a trough 38 which has a multiplicity of discharge conduits 39 so disposed transversely of the machine that one will always be vertically alined with one of the molds 4 of a mold bar positioned below the same.

Working in the vertically extended portion of each discharge conduit 39 is a pump plunger or ejector 40, all of which plungers are secured at their upper ends to a transverse bar 41. At its ends the bar 41 is pivotally connected to the upper ends of a pair of transversely spaced upright links 42, the lower ends of which latter are pivotally connected to arms 43, shown as cast integral with the arms 8 before described; and it should be here stated that said arms 8, link 10, crank rod 12, and crank or eccentric 13 are duplicated on opposite sides of the machine for the purpose of imparting parallel upward and downward movements to the ends of the bar 41. It should also be here noted that the pump plungers 40 will be moved downward while the driving pawls 11 are making their return or idle movements on the ratchet wheels 9, and that said ratchet wheels, and hence the molds 4, are given their intermittent movement by said pawls 11 while the pump plungers 40 are making their return or upward movements. Thus it will be seen that the dough is inserted into the underlying molds while the latter are stationary.

The gas burning device, as shown, is in the form of a pipe 44 which has a multiplicity of transversely extended twyer pipes 45 properly positioned to direct the flame upon the mold in which the cores and dough are inserted. By reference to Fig. 3 it will be noted that one of the side plates 1 of the frame is cut away, at 46, to permit the required air to enter the oven. It will, of course, be understood that the amount of dough dropped into each mold should be such that when the core is inserted therein, the dough will just rise to the top of the mold.

By the time the cones or cornets have passed from the rear or right hand extremities, as viewed in Fig. 3, of the guide channels 29, they will be properly baked; and after the cores have been removed they may themselves be removed from the molds, by hand or by any other suitable means. In Fig. 3 these baked cones or cornets are indicated in section by the character $y$.

As above described and as illustrated in the drawings, the mold-equipped bars 5 are connected by hinges, but in some instances it may be found preferable simply to use disconnected cone-equipped bars in close contact, arranged to slide in the endless guide channels or on guides of other suitable form.

This invention is believed to be a pioneer in the art of making cones or receptacles of the character indicated and it will, therefore, be understood that the broad claims of this application are not limited to the specific construction shown in the drawings.

Attention is called to the fact that in Fig. 2 the teeth of the gears 24 are shown only part way around the same, while as a matter of fact they will extend completely around the same, as indicated by broken lines. Attention is also called to the fact that in Fig. 3 the gears 24 are indicated only by dotted lines.

As a possible modification of this machine, the core-equipped bars might be arranged in an endless series and the shifting device or transferring mechanism could then be arranged to move the mold-equipped bars to and from engagement with the core equipped bars.

It is obvious that from a broad point of view, the coöperating molds and cores make up sectional molds, which may take various forms according to the shape or character of the article that is to be baked, and hence, that the broad claims of this application are not limited to the form or internal shape of such molds.

What I claim is:

1. In a pastry machine, an endless connected series of mold sections movable in an endless circuit or orbit, a loose series of mold sections, and means for moving said loose series in an endless circuit or orbit and into and out of coöperation with said first named series.

2. In a pastry machine, a movable connected series of mold sections, a loose series of mold sections, and a shifting device by which the loose elements of the second series are placed on and removed from the elements of the first series while being moved mechanically in an endless path.

3. In a pastry machine, the combination of an endless series of connected elements carrying mold sections and movable in an endless path, a loose series of elements carrying mold sections to coact with the first named sections, and means to place said loose elements in coöperation with the connected elements while the latter travel a certain distance and to then remove the loose elements from such coöperation, said loose elements being movable in an endless circuit.

4. In a pastry machine, a series of connected elements movable in an endless circuit and carrying mold sections, a loose series of elements carrying mold sections to coöperate with the first named sections and movable in an endless circuit, a shifting device to place the mold sections of the two series in such coöperation, and means to inject dough into the sections of the first named series.

5. In a machine for making cones, the combination with a multiplicity of bars arranged in an endless series and each provided with a multiplicity of molds, of means for imparting traveling motion to said series of bars, a multiplicity of core-equipped bars, a core bar shifter operative automatically to move said core-equipped bars into coöperative relation in respect to said mold-equipped bars at one place, and to thereafter pick up and remove the said core-equipped bars at another place, and means for applying heat to the said molds while the cores are inserted therein.

6. In a machine for making cones, the combination with a multiplicity of bars arranged in an endless series, each bar having a multiplicity of molds, of means for imparting traveling motion to said series of bars, a multiplicity of core-equipped bars, an automatic core bar shifter operative to move said core-equipped bars into coöperative relation in respect to said mold-equipped bars at one place and to thereafter pick up and remove the said core-equipped bars at another place, means for automatically supplying the cone forming material to said molds before the cores are inserted therein, and means for applying heat to said molds while the cores are inserted therein.

7. In a machine for making cones, the combination with a multiplicity of bars arranged in an endless series, each bar having a multiplicity of molds, of endless guiding means for the ends of said bars, means for imparting traveling motion to said series of bars, a multiplicity of core-equipped bars, guides operative on the ends of said core-equipped bars to hold the same in operative relation in respect to said mold-equipped bars, and a shifting device comprising a pair of wheels with core bar holders operative on the ends of said core bars to deposit the same, in succession, at the receiving ends of the guides therefor and to pick the same up, in succession, from the delivery ends of said guides.

8. In a machine for making cones, the combination with a multiplicity of mold equipped bars arranged in an endless series, of endless guides operative on the ends of said bars, means for imparting intermittent step by step traveling motion to said series of bars, a multiplicity of core-equipped bars, guides operative on the ends of said core bars to hold the same in coöperative relation in respect to said mold-equipped bars, a core bar shifting device comprising a pair of laterally spaced wheels having self-arighted core bar holders operative on the ends of said core bars to deliver the same at the receiving ends of the guides therefor and to pick the same up, in succession, from the delivery end of said guides, and means for supplying dough to the molds before the cores are inserted therein.

9. In a machine for making cones, the combination with a multiplicity of bars arranged in an endless series, and each having a multiplicity of molds, endless guides for the ends of said bars, wheels and coöperating pawl and ratchet devices for imparting intermittent step by step movement to said series of bars, a multiplicity of loose core-equipped bars, and an automatic shifter operative to deliver said core-equipped bars into coöperative relation in respect to said mold-equipped bars at one place and to pick up and remove the same therefrom at another place.

10. In a machine for making cones, the combination with a multiplicity of bars arranged in an endless series, each bar having a multiplicity of molds, of endless guides for the ends of said bars, a multiplicity of loose core-equipped bars, dowel pins arranged to aline the said bars with the cores properly positioned within said molds, and a shifting device operative on the ends of said core-equipped bars at one place to deliver the same to said mold-equipped bars and remove the same therefrom at another place.

11. In a pastry machine, an endless movable series of connected elements carrying mold sections, a series of loose elements also carrying mold sections and movable in an endless path, and a rotary shifting device by which said loose elements are placed in and removable from coöperation with the connected elements.

12. In a machine of the kind described, the combination with an endless series of mold sections and means for moving the same, of a series of loose or disconnected bars having mold members for coöperating with the mold members of said endless series, and an automatic transfer device operative on said bars to move their mold members into operative positions at one place, and to pick the same up at another place.

13. In a pastry machine, the combination of a series of connected elements carrying mold sections and traveling in an endless circuit, a series of loose elements traveling in an endless circuit above and entirely outside of the first named series, a rotary shifting device by which said loose elements are placed on the connected elements at the upper run of their circuit and removed from said elements when the loose elements have traversed such upper run of the connected elements, means to inject dough into the sections of the connected series of elements, and means to bake the dough while the sections are held together.

14. In a machine of the kind described, the combination with a multiplicity of mold sections arranged in an endless series, of means for moving the said series of mold sections, a multiplicity of loose bars having mold sections for coöperation with the sections of said endless series, an automatic transfer device operative on said bars and arranged to bring the mold members into operative positions at one point, and to pick the same up at another point, and means for applying heat to said mold sections while they are in coöperative relation or positions.

15. In a pastry machine, the combination of a connected series of hollow conical molds, a loose series of conical cores free from the molds, means to inject dough into the molds, means to deposit the cores in and remove them from the molds in which such dough has been injected, a baking device, and means to move the molds and cores, while in coöperation with each other, over the baking device.

16. In a pastry machine, the combination of a series of hollow conical molds traveling in an endless vertical circuit, means to inject dough into said molds at the upper run of said circuit, a loose series of cores free from the molds, means acting on the cores to carry them in an endless circuit and deposit them in and remove them from the molds, and a baking device over which the molds and cores are moved while in coöperation.

17. The combination of a series of cone-forming mold sections traveling in an endless circuit and in a vertical plane, a heating device located beneath the upper run of said circuit, a second series of cone-forming mold sections traveling in an endless circuit located above the first and having its lower run substantially coincident with the upper run of the first so that the mold sections are brought together and moved over said heating device, and means to inject dough into the sections of the lower circuit before said sections reach the upper run of said circuit.

18. In a machine of the kind described, the combination with a multiplicity of mold sections arranged in an endless series, of a multiplicity of loose bars having mold sections for coöperation with the molds of said endless series, and a pair of transfer wheels provided with gravity arighting circumferentially spaced holders, operative on the ends of said bars, and serving to carry said bars to and from operative positions in respect to said endless series of mold sections.

19. In a machine such as described, the combination of an endless series of connected mold sections movable in an endless circuit, loose elements each carrying a plurality of mold sections to coact with the first named mold sections, means for successively bringing said loose elements into coöperation with said endless series of mold sections, and means for holding each loose element in coöperation with said series while the latter travels a certain distance.

20. In a pastry machine, a baking device, an endless series of connected mold sections arranged to pass in operative relation with said baking device, a second series of mold sections freely separable with respect to each other and with the first-named series of mold sections, the mold sections of the second series adapted to be placed in coöperative relation with those of the first series and moved past said baking device while in such coöperative relation, and said mold sections of the second series being freely removable from those of the first series.

21. In a pastry machine, a baking device and two series of coöperating mold sections movable in coöperative relation past said baking device, the mold sections of one series being connected to form an endless series having a predetermined line of travel, and the members of the other series at some point in their travel being freely separable from each other and freely removable from the first series and from association with said baking devices.

In testimony whereof I affix my signature in presence of two witnesses.

KARL WESSEL.

Witnesses:
HARRY D. KILGORE,
F. D. MERCHANT.